United States Patent [19]

Tatsumi et al.

[11] Patent Number: 4,517,445

[45] Date of Patent: May 14, 1985

[54] VACUUM INSULATED HEAT POT WITH REMOVABLE ELECTRICALLY HEATED RESERVOIR TANK

[75] Inventors: Hisao Tatsumi, Nagoya; Takashi Kawano, Seto, both of Japan

[73] Assignee: Tokyo Shibaura Denki Kabushiki Kaisha, Japan

[21] Appl. No.: 384,054

[22] Filed: Jun. 1, 1982

[51] Int. Cl.³ .................... H05B 3/00; B67D 5/62; F24H 1/06

[52] U.S. Cl. .................... 219/297; 215/13 R; 219/311; 219/432; 219/436; 219/438; 219/441; 222/209; 222/146.5

[58] Field of Search ............... 219/296, 301, 311, 297, 219/308, 432, 433, 436–438, 441, 442, 521, 271, 275; 222/209, 146 HE, 146 R, 146 H; 215/13 R

[56] References Cited

U.S. PATENT DOCUMENTS

| | | | |
|---|---|---|---|
| 972,248 | 10/1910 | Richmond | 219/441 |
| 1,588,122 | 6/1926 | Massingham | 219/433 X |
| 2,680,190 | 6/1954 | Schmidt | 219/432 |
| 2,735,925 | 2/1956 | Mikolay | 219/433 |
| 3,453,947 | 7/1969 | George et al. | 219/433 X |
| 3,752,347 | 8/1973 | Bell | 215/13 R |
| 3,905,520 | 9/1975 | Mishioka | 222/209 |
| 4,359,174 | 11/1982 | Ikumosuke et al. | 222/209 |

FOREIGN PATENT DOCUMENTS

| | | | |
|---|---|---|---|
| 72763 | 6/1944 | Czechoslovakia | 219/437 |
| 381950 | 9/1923 | Fed. Rep. of Germany | 219/438 |
| 812588 | 9/1951 | Fed. Rep. of Germany | 219/438 |
| 793381 | 11/1935 | France | 219/438 |
| 854206 | 1/1940 | France | 219/438 |
| 993980 | 11/1944 | France | 219/271 |
| 54-59662 | 5/1979 | Japan | 219/437 |
| 159364 | 3/1933 | Switzerland | 219/438 |

Primary Examiner—A. Bartis
Attorney, Agent, or Firm—Cushman, Darby & Cushman

[57] ABSTRACT

An electrically heated pot for heating the keeping warm a liquid includes a vacuum container having a vacuum region formed between the outer surface of a cylindrical internal tank and the inner surface of an external tank. The internal tank has an opening at one end. A cylindrical reservoir tank for accomodating the liquid to be heated is removably located within the internal tank through the opening. The central portion of the reservoir tank is in close contact with the inner surface of the internal tank, while an end portion thereof opposite the opening is shaped to define with the internal tank a heater mounting room. A thermostatically controlled electric heater is mounted on the surface of the reservoir tank in the heater mounting room and is removable with the reservoir tank through the opening. A power supply wire connected to the heater is led to the outside of the vacuum container along the length of the reservoir tank to the outside of the container through the opening through a guide groove formed in either the inner surface of the internal tank or the outer surface of the reservoir tank or through a guide pipe passing through the reservoir tank. A handle frame removably holds the vacuum container and has a pivoted lid for closing the opening and a bellows pump is provided on the lid for pressurizing the reservoir tank for discharging heated liquid.

8 Claims, 3 Drawing Figures

VACUUM INSULATED HEAT POT WITH REMOVABLE ELECTRICALLY HEATED RESERVOIR TANK

BACKGROUND OF THE INVENTION

This invention relates to a heat pot with a heater which maintains the temperature of hot liquid contained therein by heating the liquid with a heater.

A heat pot has been proposed with a vacuum container having excellent heat insulation properties. This vacuum container consists of an external and an internal tank, the space between the walls of which is vacuumized. The internal tank also serves as a reservoir tank to accommodate the liquid. This heat pot is provided with a heater or heat pipe that transmits heat from a heater, which is located within the internal tank passing through the vacuum region and heats the liquid within the internal tank. When this heat pot is used, only about one or two Watts of electricity is required to keep about 2 l of hot water at about 90° C. A better heat insulation performance therefore exists when compared with conventional heat pots. However, since this kind of heat pot is generally made of metals such as stainless steel, heat from the heater may be transmitted to the external tank wall of the vacuum container via the portion through which the heater is passing, and thus leak to the outside of the vacuum container. Further, in the same way, the heat of the liquid within the internal tank may also leak to the outside via the heater and the portion of the vacuum container.

Another known heat pot has been proposed with a heater within the vacuum region of the vacuum container. In this heat pot, since the heater does not pass through the vacuum region, the heat from the heater or heat of the liquid within the internal tank almost never leaks out of the vacuum container. However common heaters gradually generate various gases from their resistance wires and micas, while metallic sheathed heaters do so from the magnesia electrically insulating the resistance wire from the metal sheath. As a result, in these types of heat pots, the gas generated from the heater is collected in the vacuum region reducing the degree of vacuum in this region. The reduction of the vacuum degree may deteriorate the heat insulation ability of the vacuum region. Further the structure of these types of heat pots suffer from the defect that when either the heater or the vacuum container is inoperable or broken, complete replacement of each is required.

SUMMARY OF THE INVENTION

This invention has been made in view of the aforesaid problems, and its object is to provide a heat pot with a heater which can efficiently maintain the temperature of hot liquid in the reservoir tank without permitting heat from the heater and liquid from the reservoir tank leak out and without reducing the degree of vacuum in the vacuum container. Further, the present invention can facilitate the exchange or replacement of the present heater and the vacuum container.

According to one aspect of the invention, a heat pot comprises a vacuum container including an external tank and a cylindrical internal tank having an opening at one end thereof. The internal tank is located within the external tank with its outer surface spaced from the inner surface of the external tank by a certain distance and defining a vacuum region between its outer surface and the inner surface of the external tank. A reservoir tank to accommodate the liquid therein is also provided, the reservoir tank being located within the internal tank and removable through the opening of the internal tank of the vacuum container. A heater mounting room is defined between its outer surface and the inner surface of the internal tank and a heater is mounted on the outer surface part of the reservoir tank within the heater mounting room for heating the liquid within the reservoir tank. A power supply wire is operatively connected with the heater and leads to the outside of the vacuum container through the opening of the internal tank of the vacuum container for supplying the heater with electricity.

In the heat pot of the present invention, the heater is attached to the outer surface of the reservoir tank without passing through the vacuum region of the vacuum container. Further the power supply wire which supplies the heater with electricity is also led to the outside of the vacuum container through the opening of the internal tank without passing through the vacuum region. Therefore, the heat from the heater and that of the liquid within the reservoir tank do not leak out through the vacuum container. Additionally, the degree of vacuum in the vacuum region is not reduced utilizing the structure of the present invention. Accordingly, the heat pot of the present invention can efficiently maintain the elevated termperature of hot liquid. Further, the heat pot of the present invention does not require any complicated sealing structure for the vacuum container since the heater and power supply wire do not pass through the vacuum region. Therefore the structure of the vacuum container is simplified. In addition, the heater is removable together with the reservoir tank through the opening of the internal tank, and thus, when any one of the heater or vacuum container are out of order or are broken, each can be individually and easily exchanged.

DETAILED DESCRIPTION OF THE PREFERRED EMBODIMENT

The embodiments of this invention will be described in detail in reference to the accompanying drawings.

Figure 1:
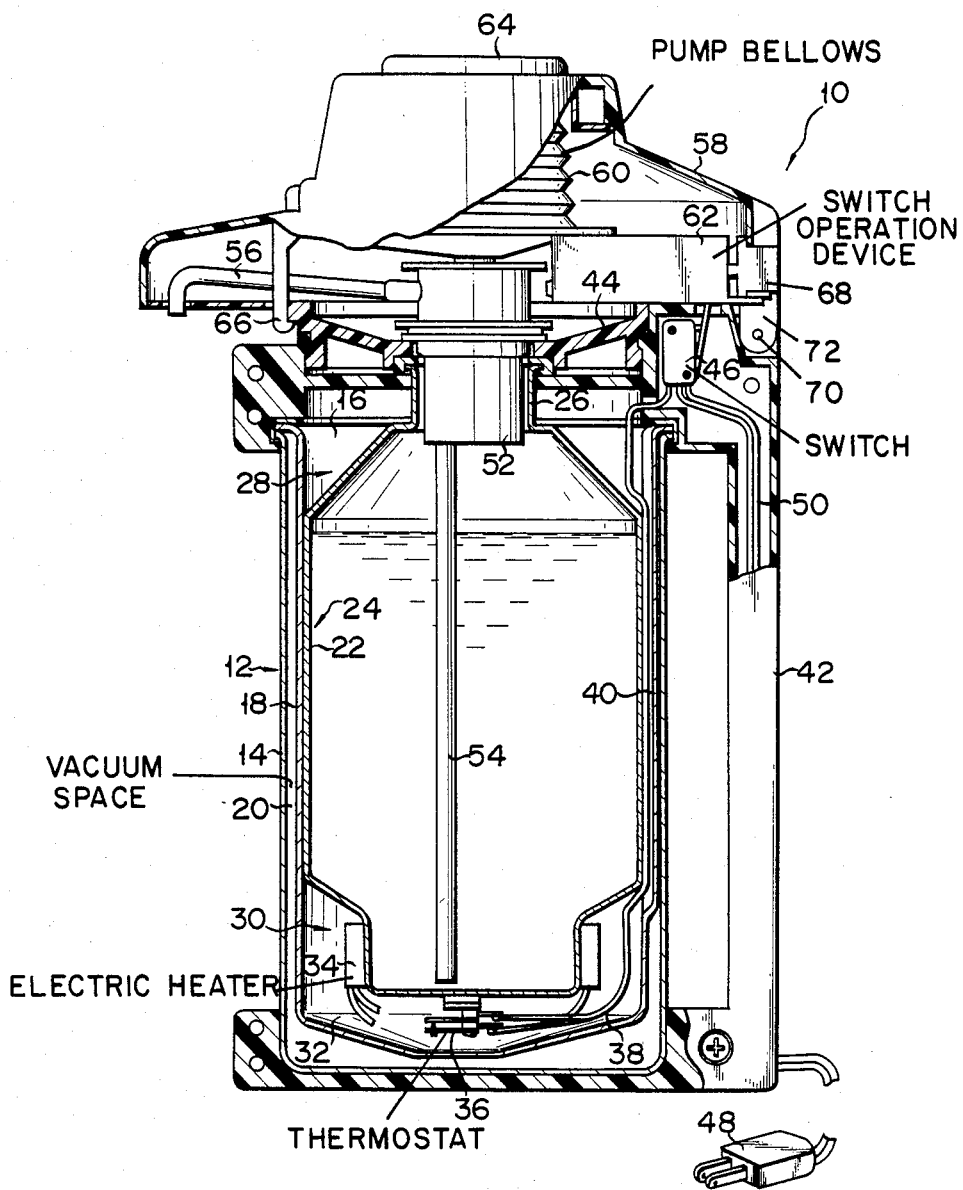
FIG. 1 shows a longitudinal sectional view of the first embodiment of the heat pot according to this invention.

As shown in FIG. 1, the heat pot 10 according to the first embodiment of this invention is provided with a vacuum container 12. This vacuum container 12 includes a cylindrical external tank 14, the bottom end of which is closed, and a cylindrical internal tank 18, the top end of which has an opening 16 and the bottom end of which is closed. The internal tank 18 has a smaller outside diameter than the inside diameter of the external tank 14, and the internal tank is concentrically contained within the external tank. Accordingly, the outer surface of the internal tank 18 is spaced from the inner surface of the external tank by a certain distance and between is defined a vacuum region 20. The external tank 14 and the internal tank 18 are made of a metal, e.g. stainless steel.

Further, heat pot 10 is provided with a reservoir tank 22 for accommodating the liquid therein. Reservoir tank 22 is contained within the internal tank 18 and is removable through its opening 16. The reservoir tank 22 has a cylindrical central portion 24 having an outside diameter which is about equal to the inside diameter of the internal tank 18. Practically the entire outer circumferential surface of the central portion is so as to be in close contact with the inner circumferential surface of the internal tank. Further reservoir tank 22 comprises an upper end portion 28 connected with the top of the central portion 24 and having a neck 26 which upwardly protrudes from the vacuum container 12 through the opening 16, and a lower end portion 30 connected with the bottom of the central portion 24 and having its outer surface spaced from the inner surface of the internal tank 18 by a certain distance. A sealed heater mounting room 32 is defined between the outer surface of the lower end portion 30 and the inner surface of the internal tank 18.

Heater 34 is mounted within the heater mounting room 32 on the outer surface of the lower end portion 30 of the reservoir tank 22. Further, a thermostat 36 is mounted within the heater mounting room 32 on the outer surface of the lower end portion 30 in a similar way. A power supply wire 38 for supplying the heater 34 with electricity is connected with the heater via the thermostat 36. The internal tank 18 includes a guide groove 40 which is formed defined on its inner surface and which has one end communicating with the heater mounting room 32 and the other end communicating with the opening 16. Power supply wire 38 is led to the outside of the vacuum container 12 from the opening 16 through the guide groove 40.

The heat pot 10 is further provided with a handle frame 42 which removably holds the vacuum container 12. This handle frame 42 includes a ring board 44. The reservoir tank 22 hungs down into the internal tank 18 with the neck 26 supported by the handle frame 42 through the ring board 44.

A switch 46 is attached to the handle frame 42 in the vicinity of the opening 16 of the internal tank 18, and the power supply wire 38 is connected through the switch with a power source wire 50 having a plug 48. A plug 52 is fitted in the neck 26, and a liquid suction tube 54 hangs from this plug 52 into the reservoir tank 22. A liquid discharge tube 56 is extended from the plug 52 to the outside of the vacuum container 12. Further a lid 58 is pivotably mounted on the top of the handle frame 42. Bellows 60 are provided on lid 58 to supply air to the inside of the reservoir tank 22 via the plug 52 to discharge the liquid from the reservoir tank through the liquid suction and discharge tubes 54, 56. An operation device 62 includes a manually operable switch button 68 operatively connected to switch 46 so as to control (in an on/off manner) the electricity supplied to heater 34. Thus, when button 68 is manually pushed, device 62 is caused to actuate switch 46 and turn it to the "on" position. As a result, electricity is supplied to heater 34. Conversely, if button 68 is again pushed, device 62 turns switch 46 to the "off" position. A push button 64 is also provided for depressing bellows 60 while a clamp 66 is provided to lock lid 58 to the handle frame 42. In the event that lid 58 is attempted to be opened (as by pivoting lid 58 about pivot point 70 of hinge 72) when electricity is being supplied to heater 34, device 62 will become separated from switch 46 and, as a result, switch 46 is automatically turned to the "off" position.

In the heat pot 10 with the construction described above, the liquid, e.g. water, poured into the reservoir tank 22 via the neck 26 is heated and boiled by the heater 34. The thermostat 36 senses the liquid temperature within the reservoir tank 22 and turns the heater 34 on or off at a proper interval so that the liquid is kept at a certain temperature. In this heat pot 10, the heater 34 does not pass through the vacuum region 20 of the vacuum container 12, but is located within the heater mounting room 32, a space defined by the inner surface of the internal tank 18 and the outer surface of the bottom end portion 30 of the reservoir tank 22. As a result, heat generated by the heater 34 does not transmit directly to the external tank 14, but the heat must pass through a long distance to the top end of the internal tank 18 until it reaches the external tank 14. Meanwhile, the heat from the heater 34 is transmitted to the liquid inside the reservoir tank 22 via the tank wall and seldom leaks out of the vacuum container 12. Similarly, almost no heat of the liquid inside the reservoir tank 22 can leak out of the vacuum tank 22 through the heater 34. Further, since the heater 34 is not provided within the vacuum region 20, but rather, is provided within the heater mounting room 32, even if various gases are generated from the heater, they are not collected in the vacuum region. Therefore, these gases can produce neither reduction of the degree of vacuum in the vacuum region 20, nor degradation in the heat insulation performance of the vacuum container 12. Further, like the heater 34, the power supply wire 38 does not pass through the vacuum region 20, but is led to the outside of the vacuum container 12 through the opening 16 of the internal tank 18. As a result, there is no need of providing the vacuum container 12 with a complex sealing structure. Thus, the structure of the vacuum container can be simplified. Moreover, the reservoir tank 22 is removalby arranged via the opening 16 of the internal tank 18. Therefore, even if either one of the heater 34 or the vacuum container 12 become inoperable or broken, each can be individually replaced by removing the heater together with the reservoir tank 22 from the vacuum container 12. Similarly when the reservoir tank 22 become inoperable or is damaged, it can also be separately replaced. Therefore the replacement of these parts can be easily made at a low cost.

On the other hand, since the thermostat 36 is provided within the heater mounting room 32 which is almost sealed by the inner surface of the internal tank 18 and the outer surface of the bottom end portion 30 of the reservoir tank 22, it is little affected by the outside air and can perform temperature control with accuracy.

Figure 2:
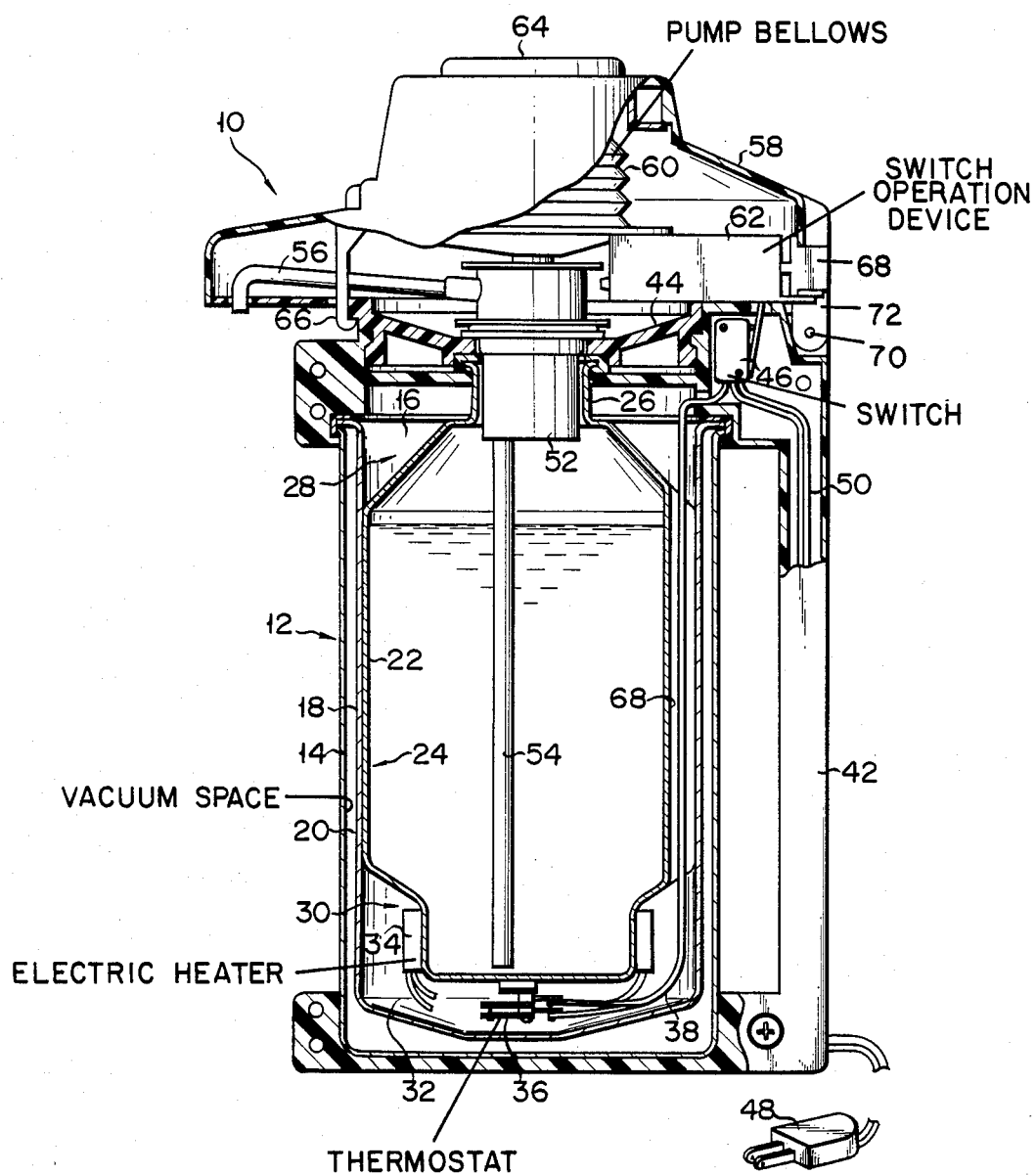
FIG. 2 shows a longitudinal sectional view of the second embodiment of the heat pot according to this invention.

Next the second embodiment according to this invention will be explained below referring to FIG. 2. This second embodiment differs from the above first embodiment in that the internal tank 18 does not define guide groove 40. Rather it is the reservoir tank 22 which defines a guide groove 68 instead. This guide groove 68 is formed on the outer circumferential surface of the central portion 24 of the reservoir tank 22. One end of the groove 68 communicates with the heater mounting room 32 and the other end thereof communicates with the outside of the vacuum container 12 through the opening 16. The power supply wire 38 is led to outside of the vacuum container 12 via the opening 16, passing through the guide groove 68. Guide groove 68 and the guide groove 40 in the above embodiments can most easily permit the power supply wire 38 to be led to the outside of the vacuum container 12 through the opening 16 without passing it through the vacuum region 20.

Figure 3:
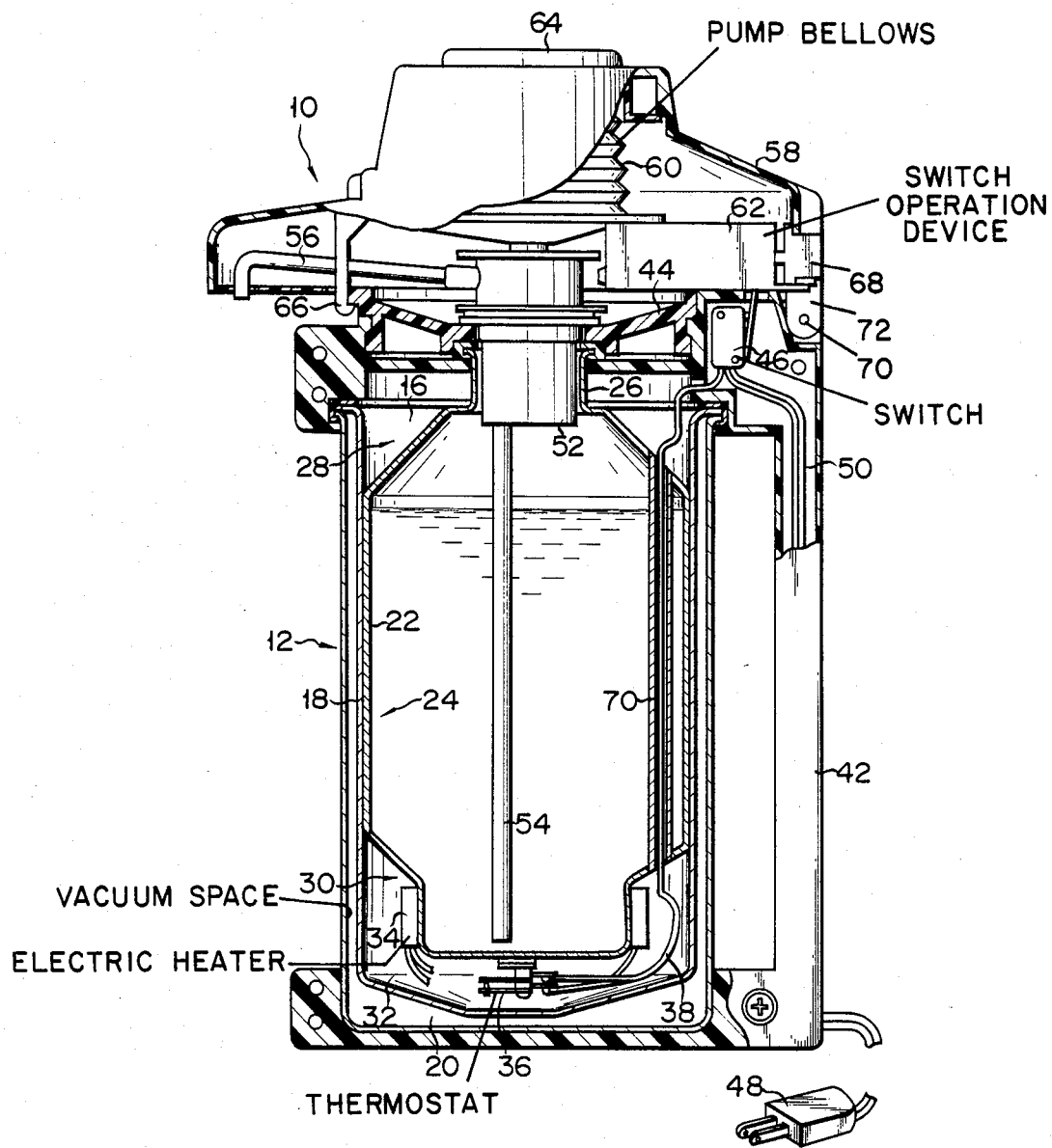
FIG. 3 shows a longitudinal sectional view of the third embodiment of the heat pot according to this invention.

FIG. 3 shows the third embodiment according to this invention. This third embodiment differs from the above second embodiment in that the reservoir tank 22 includes a guide pipe 70 in place of the above-mentioned guide groove 68. This guide pipe 70 passes through the reservoir tank 22, and has one end which is opened at the outer surface of the bottom end portion 30 while its other end is opened at the external surface of the top end portion 28. Power supply wire 38 is led to the outside of the vacuum container 12 via the opening 16 passing through this guide pipe 70. In this third embodiment, the entire circumferential surface of the central portion 24 of the reservoir tank 22 is made into close contact with the inner circumferential surface of the internal tank 18, so that leakage of heat from the heater 34 can be prevented most reliably.

In the above first to third embodiments, the central portions of the internal tank and the reservoir tank is preferably a cylindrical in shape. However, this invention is not limited to this shape, but may be made hexagonal or square shaped.

What we claim is:

1. A heat pot for heating and keeping warm a liquid comprising
   a vacuum container including an external tank and a cylindrical internal tank having an opening at one end thereof, the internal tank being located within the external tank with its outer surface spaced from inner surface of the external tank at a certain distance to define a vacuum region between its outer surface and the inner surface of the external tank;
   a reservoir tank for accommodating the liquid therein, the reservoir tank being located within the internal tank and removable through said opening thereof, said reservoir tank having a cylindrical central portion, substantially the entire circumferential surface of which is in close contact with the inner surface of the internal tank, and a lower end portion connected to one end of the central portion apart from said internal tank opening, the outer surface of said lower end portion being spaced from the inner surface of said internal tank to define a substantially sealed heater mounting room between its outer surface and the inner surface of the internal tank;
   an electric heater mounted on the outer surface of the reservoir tank within the heater mounting room for heating the liquid within the reservoir tank; and
   a power supply wire connected with the heater and led, along the length of the reservoir tank, to the outside of the vacuum container through the opening of the internal tank of the vacuum container for supplying the heater with electricity.

2. A heat pot according to claim 1 wherein said reservoir tank includes an upper end portion connected to the other end of the central portion and having a neck protruding from the vacuum container through the opening of the internal tank.

3. A heat pot according to claim 2, wherein said internal tank of the vacuum container has a guide groove which is formed on the inner surface of the internal tank, and of which one end communicates with the heater mounting room and the other end communicates with the opening of the internal tank respectively, the power supply wire passing through the guide groove and being led to the outside of the vacuum container through the opening.

4. A heat pot according to claim 2, wherein said reservoir tank has a guide groove which is formed on the outer circumferential surface of the central portion, and of which one end communicates with the heater mounting room and the other end communicates with the opening of the internal tank respectively, the power supply wire passing through the guide groove and being led to the outside of the vacuum container through the opening.

5. A heat pot according to claim 2 wherein said reservoir tank has a guide pipe which is provided passing through the reservoir tank, and of which one end is opened at the outer surface of said upper end portion of the reservoir tank while the other end is opened at the outer surface of said lower end portion thereof respectively, the power supply wire passing through the guide pipe and being led to the outside of the vacuum container via the opening of the internal tank.

6. A heat pot according to claim 3, 4, or 5 further comprising a thermostat attached to the outer surface of the reservoir tank within the heater mounting room, the power supply wire being connected with the heater through the thermostat.

7. A heat pot according to claim 2, which comprises a handle frame that removeably holds the vacuum container, a lid pivotally mounted on the handle frame, said lid being configured to close said opening of said internal tank, and a discharge means operatively associated with said lid for sucking the liquid within the reservoir tank and discharging it to the outside of the vacuum container, and wherein the reservoir tank is supported by the handle frame and is hung down within the internal tank of the vacuum container.

8. A heat pot according to claim 7, wherein said discharge means includes a liquid suction tube hung down into the reservoir tank, a liquid discharge tube extended to the outside of the vacuum container, and a bellows which supplies air to the inside of the reservoir tank to discharge the liquid from the reservoir tank to the outside of the vacuum container through the liquid suction and discharge tubes.

* * * * *